US012591686B2

(12) United States Patent (10) Patent No.: US 12,591,686 B2
Ben Salem et al. (45) Date of Patent: Mar. 31, 2026

(54) SCALABLE SOURCE CODE VULNERABILITY REMEDIATION

(71) Applicant: Accenture Global Solutions Limited, Dublin (IE)

(72) Inventors: Malek Ben Salem, Falls Church, VA (US); Mário Lauande Lacroix, Toronto (CA); Bai Chien Kao, Amherst, MA (US); Karthik Rajkumar Kannan, Chennai (IN); Young Ki Lee, Austin, TX (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 202 days.

(21) Appl. No.: 18/034,844

(22) PCT Filed: Nov. 4, 2021

(86) PCT No.: PCT/EP2021/080642
§ 371 (c)(1),
(2) Date: May 1, 2023

(87) PCT Pub. No.: WO2022/096574
PCT Pub. Date: May 12, 2022

(65) Prior Publication Data
US 2024/0045971 A1 Feb. 8, 2024

(30) Foreign Application Priority Data
Nov. 5, 2020 (IN) .............................. 202011048370

(51) Int. Cl.
*G06F 21/57* (2013.01)
*G06F 21/56* (2013.01)

(52) U.S. Cl.
CPC .......... *G06F 21/577* (2013.01); *G06F 21/563* (2013.01); *G06F 2221/033* (2013.01)

(58) Field of Classification Search
CPC . G06F 21/577; G06F 21/563; G06F 2221/033
See application file for complete search history.

(56) References Cited

U.S. PATENT DOCUMENTS

2018/0157845 A1* 6/2018 Mehta ................... G06F 21/577
2019/0228319 A1 7/2019 Gupta et al.
(Continued)

FOREIGN PATENT DOCUMENTS

CN 110245496 A 9/2019
EP 3441875 A1 2/2019
WO 2022096574 A1 5/2022

*Primary Examiner* — Rupal Dharia
*Assistant Examiner* — Raghavender Cholleti
(74) *Attorney, Agent, or Firm* — Mannava & Kang, P.C.

(57) ABSTRACT

In some examples, scalable source code vulnerability remediation may include receiving source code that includes at least one vulnerability, and receiving remediated code that remediates the at least one vulnerability associated with the source code. At least one machine learning model may be trained to analyze a vulnerable code snippet of the source code. The vulnerable code snippet may correspond to the at least one vulnerability associated with the source code. The machine learning model may be trained to generate, for the vulnerable code snippet, a remediated code snippet to remediate the at least one vulnerability associated with the source code. The remediated code snippet may be validated based on an analysis of whether the remediated code snippet remediates the at least one vulnerability associated with the source code.

14 Claims, 20 Drawing Sheets

(56) References Cited

U.S. PATENT DOCUMENTS

| | | | |
|---|---|---|---|
| 2019/0370473 A1* | 12/2019 | Matrosov | G06N 3/044 |
| 2020/0202007 A1* | 6/2020 | Nagaraja | G06F 8/71 |
| 2021/0124830 A1* | 4/2021 | Dinh | G06F 21/577 |
| 2024/0028740 A1* | 1/2024 | Chan | G06F 21/577 |
| 2024/0403438 A1* | 12/2024 | Chan | G06F 11/0793 |

* cited by examiner

SOURCE CODE
104

Auto-Remediation

400

SELECT
STRATEGY

Strategy Classification

402

MATCH

Edit Action
Classification

404

TRANSFORM

Code abstraction
Seq2seq Model

REMEDIATED CODE
SNIPPET
118

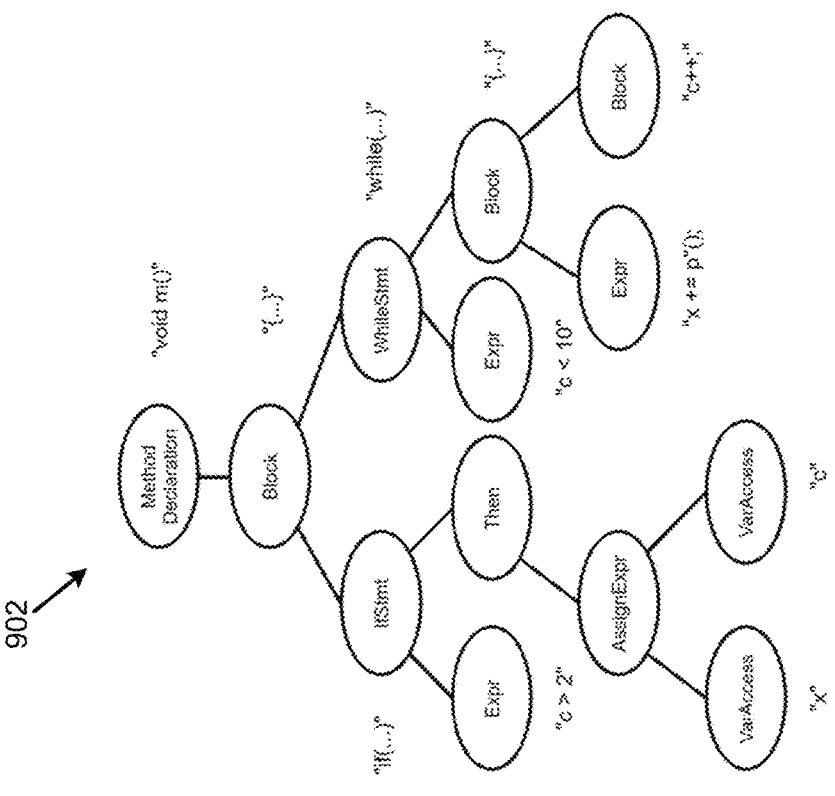
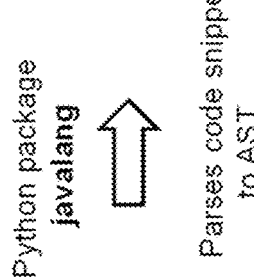
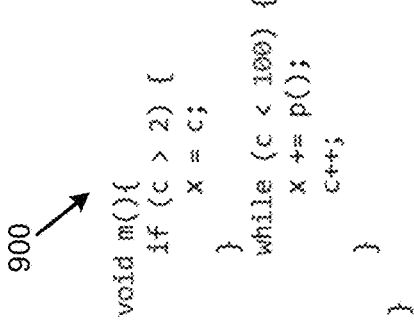
*FIG. 9*

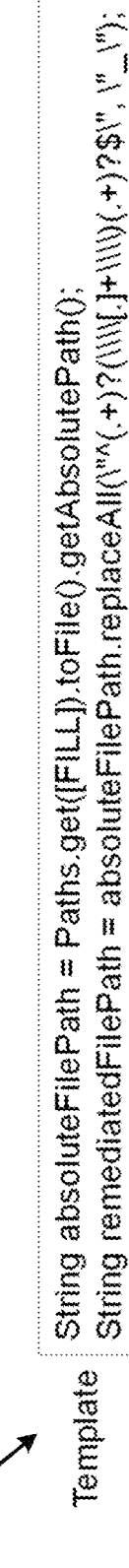
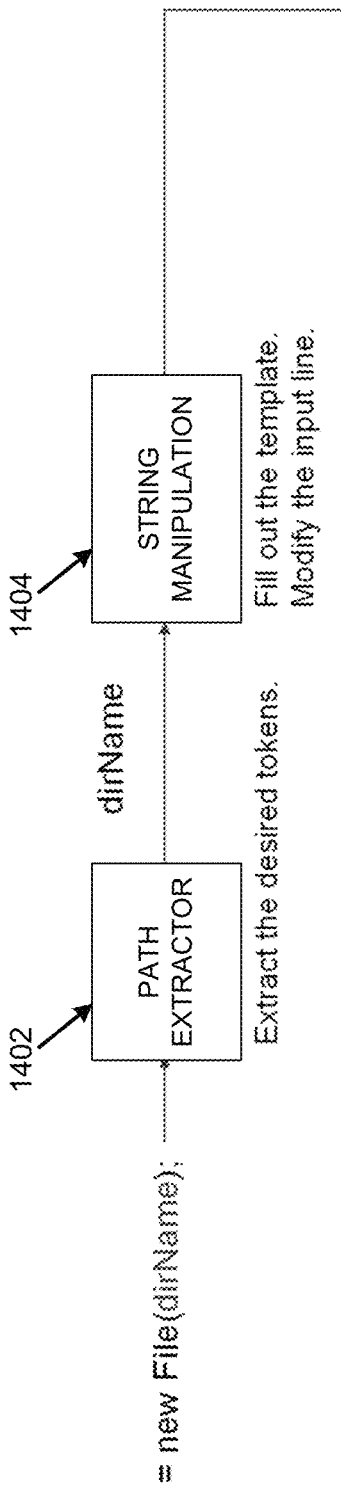
*FIG. 14*

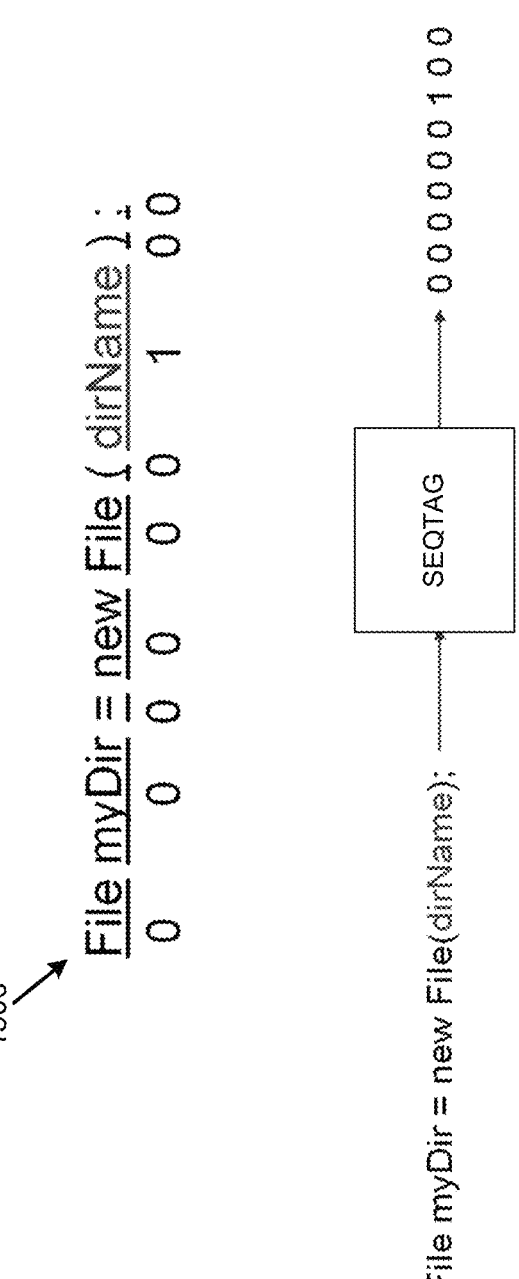
File myDir = new File ( dirName );
1500
File myDir = new File(dirName);
SEQTAG
000000100
0 0 0 0 0 0 0 1 0 0
*FIG. 15*

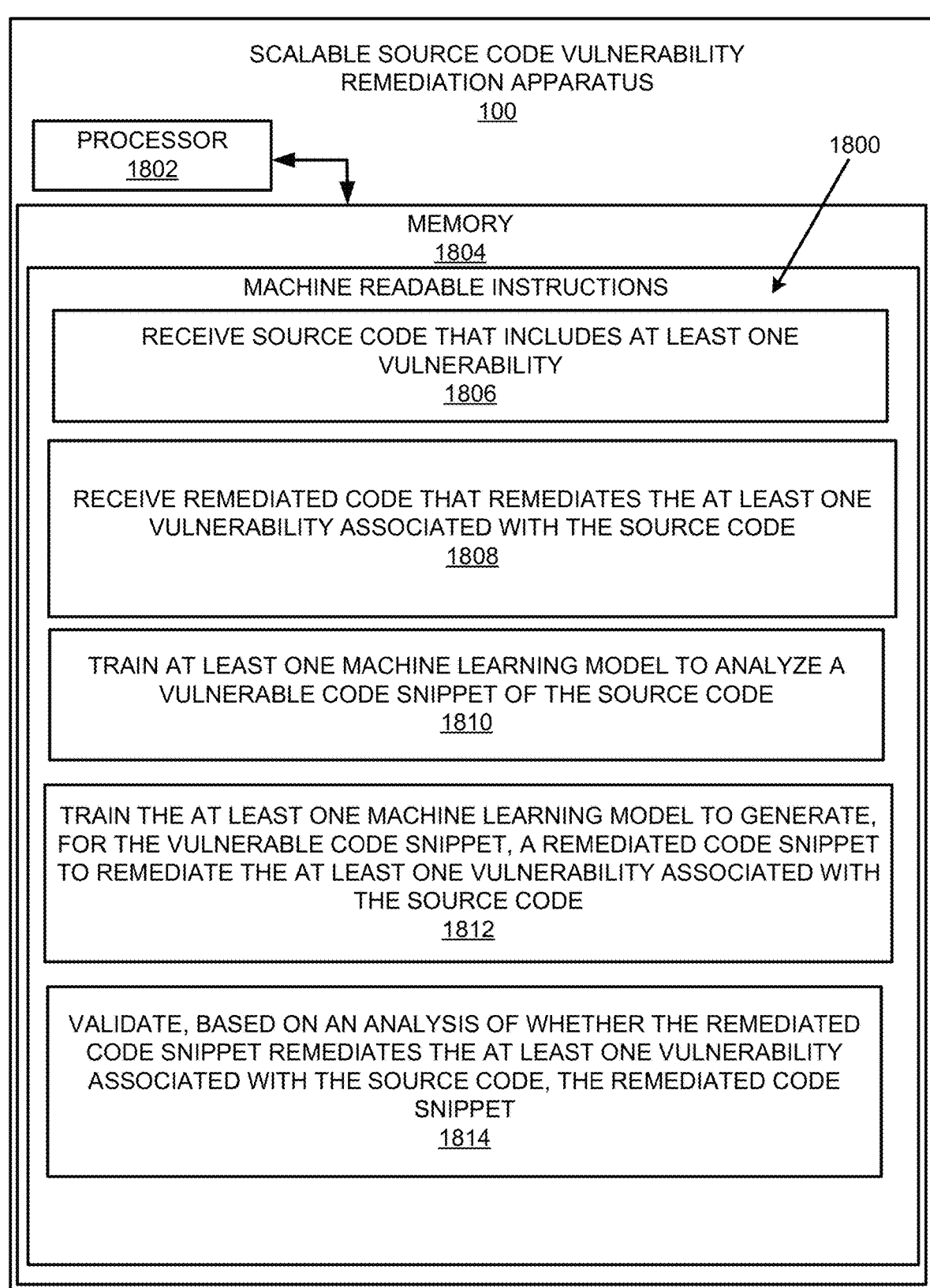

SCALABLE SOURCE CODE VULNERABILITY
REMEDIATION APPARATUS
100

PROCESSOR
1802

1800

MEMORY
1804

MACHINE READABLE INSTRUCTIONS

RECEIVE SOURCE CODE THAT INCLUDES AT LEAST ONE
VULNERABILITY
1806

RECEIVE REMEDIATED CODE THAT REMEDIATES THE AT LEAST ONE
VULNERABILITY ASSOCIATED WITH THE SOURCE CODE
1808

TRAIN AT LEAST ONE MACHINE LEARNING MODEL TO ANALYZE A
VULNERABLE CODE SNIPPET OF THE SOURCE CODE
1810

TRAIN THE AT LEAST ONE MACHINE LEARNING MODEL TO GENERATE,
FOR THE VULNERABLE CODE SNIPPET, A REMEDIATED CODE SNIPPET
TO REMEDIATE THE AT LEAST ONE VULNERABILITY ASSOCIATED WITH
THE SOURCE CODE
1812

VALIDATE, BASED ON AN ANALYSIS OF WHETHER THE REMEDIATED
CODE SNIPPET REMEDIATES THE AT LEAST ONE VULNERABILITY
ASSOCIATED WITH THE SOURCE CODE, THE REMEDIATED CODE
SNIPPET
1814

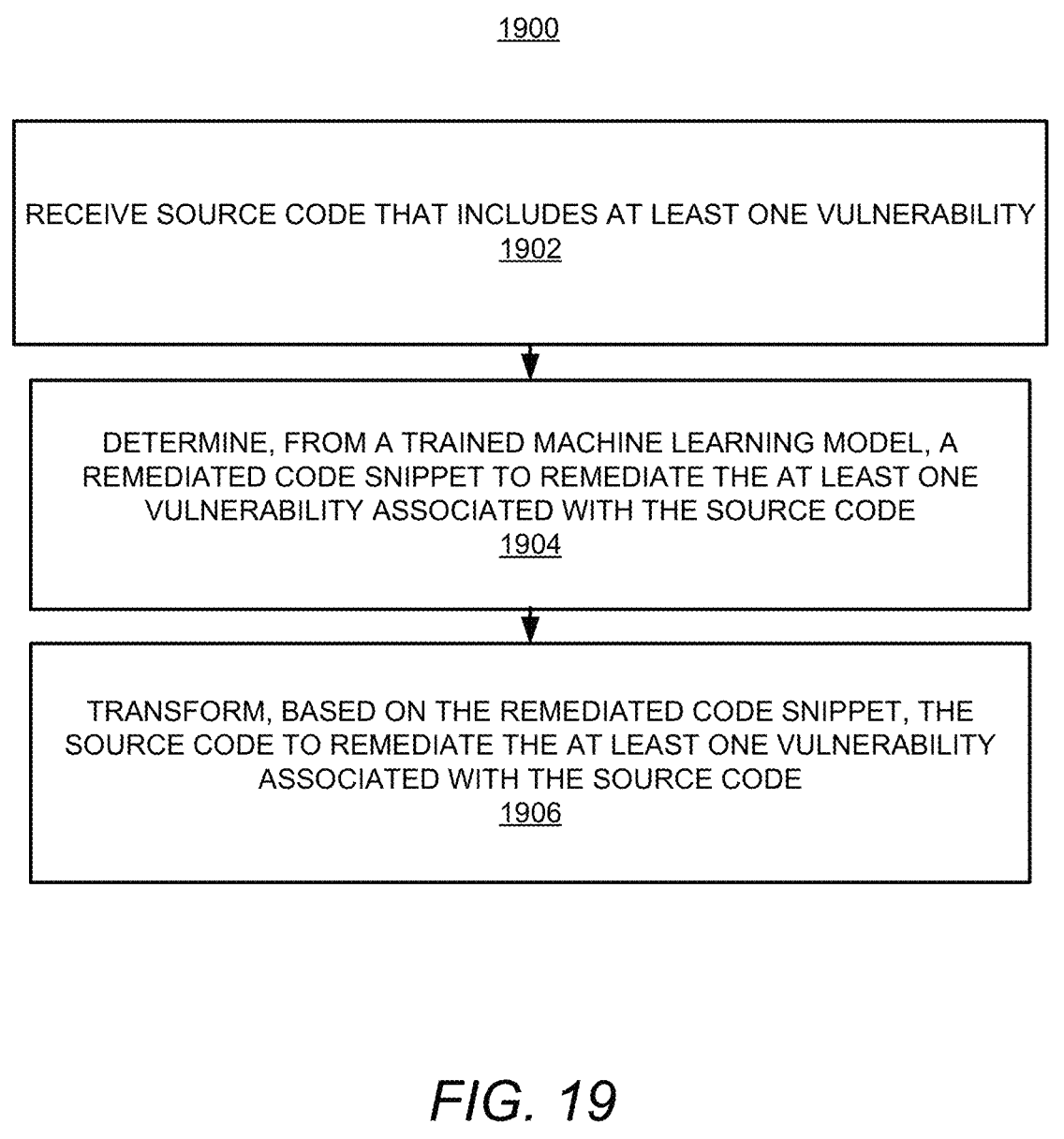

RECEIVE SOURCE CODE THAT INCLUDES AT LEAST ONE VULNERABILITY
1902

DETERMINE, FROM A TRAINED MACHINE LEARNING MODEL, A
REMEDIATED CODE SNIPPET TO REMEDIATE THE AT LEAST ONE
VULNERABILITY ASSOCIATED WITH THE SOURCE CODE
1904

TRANSFORM, BASED ON THE REMEDIATED CODE SNIPPET, THE
SOURCE CODE TO REMEDIATE THE AT LEAST ONE VULNERABILITY
ASSOCIATED WITH THE SOURCE CODE
1906

*FIG. 19*

SCALABLE SOURCE CODE VULNERABILITY REMEDIATION

PRIORITY

The present application is a national stage filing under 35 U.S.C 371 of PCT application number PCT/EP2021/080642, having an international filing date of Nov. 4, 2021, which claims priority under 35 U.S.C. 119 (a)-(d) to Indian Provisional Patent Application No. 20/201,1048370, having a filing date of Nov. 5, 2020, the disclosures of which are hereby incorporated by reference in their entireties.

BACKGROUND

A software application may include source code that is used to perform specified functions associated with the application. The software application may be subject to attacks to alter an intended performance of the specified functions. Various techniques may be utilized to minimize vulnerability of the software application to such attacks.

BRIEF DESCRIPTION OF DRAWINGS

Features of the present disclosure are illustrated by way of example and not limited in the following figure(s), in which like numerals indicate like elements, in which:

FIG. 9 illustrates further details of the graph matching network approach of FIG. 8, including conversion of code to abstract syntax tree (AST), to illustrate operation of the scalable source code vulnerability remediation apparatus of FIG. 1, in accordance with an example of the present disclosure;

FIG. 14 illustrates a remediation flow to illustrate operation of the scalable source code vulnerability remediation apparatus of FIG. 1, in accordance with an example of the present disclosure;

FIG. 15 illustrates sequence tagging to illustrate operation of the scalable source code vulnerability remediation apparatus of FIG. 1, in accordance with an example of the present disclosure;

FIG. 18 illustrates an example block diagram for scalable source code vulnerability remediation in accordance with an example of the present disclosure;

FIG. 19 illustrates a flowchart of an example method for scalable source code vulnerability remediation in accordance with an example of the present disclosure.

DETAILED DESCRIPTION

Figure 1:
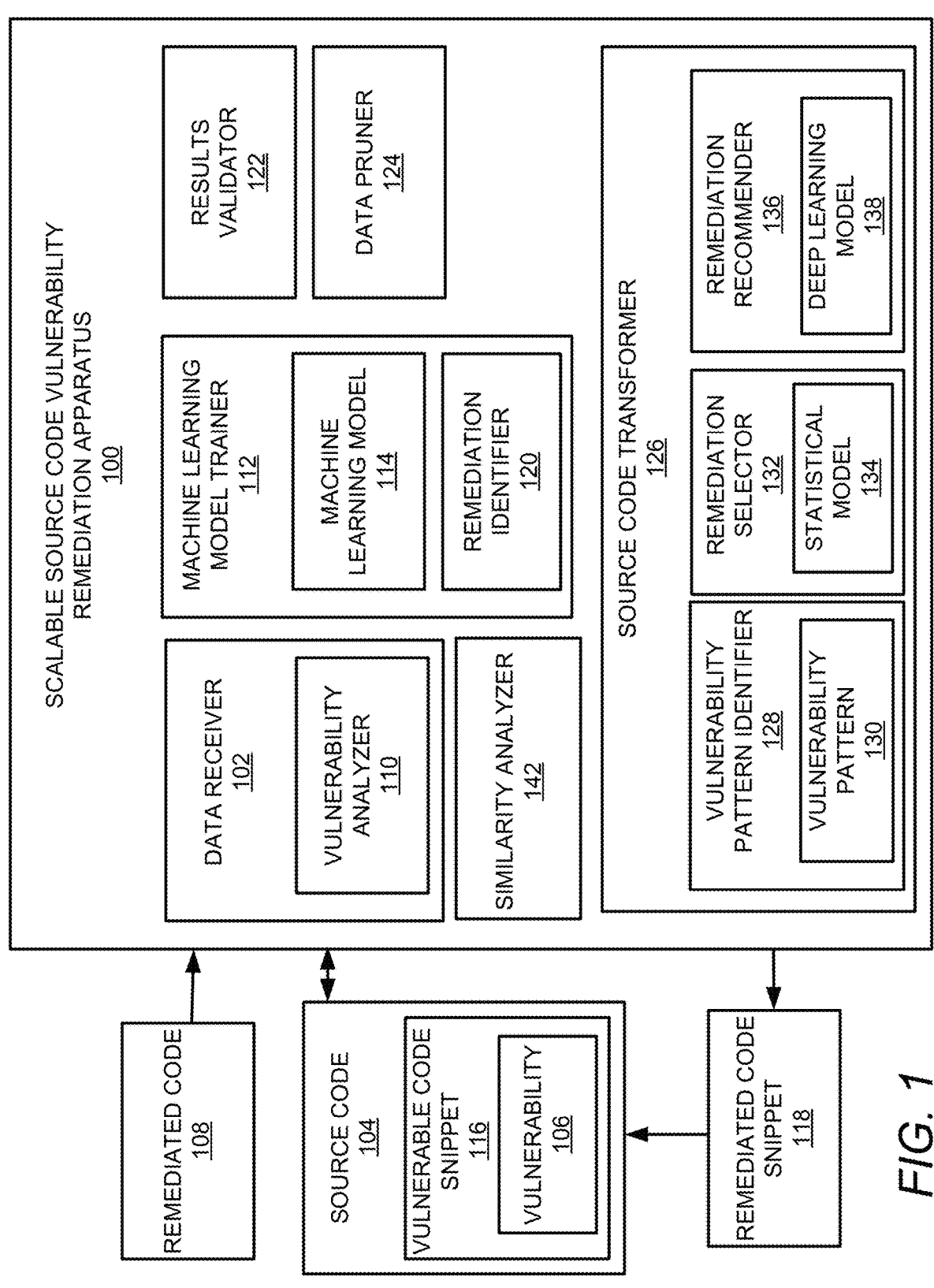
FIG. 1 illustrates a layout of a scalable source code vulnerability remediation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Scalable source code vulnerability remediation apparatuses, methods for scalable source code vulnerability remediation, and non-transitory computer readable media having stored thereon machine readable instructions to provide scalable source code vulnerability remediation are disclosed herein. The apparatuses, methods, and non-transitory computer readable media disclosed herein provide for scalable source code vulnerability remediation by automatically (e.g., without human intervention) remediation (e.g., fixing) of vulnerabilities identified, for example, by static vulnerability scanners, in source code. In this regard, the apparatuses, methods, and non-transitory computer readable media disclosed herein provide for a reduction in computerized resource utilization for security resources that may be utilized to monitor and remediate vulnerabilities in source code. The apparatuses, methods, and non-transitory computer readable media disclosed herein also provide for improvement in the quality and operation of an application that utilizes source code that is vulnerable to attack.

With respect to addressing vulnerabilities in source code, it is technically challenging to objectively and accurately identify vulnerabilities in source code, and to remediate such vulnerabilities.

The apparatuses, methods, and non-transitory computer readable media disclosed herein may address at least the aforementioned technical challenges by receiving source code that includes at least one vulnerability, and receiving remediated code that remediates the at least one vulnerability associated with the source code. A machine learning model may be trained to analyze a vulnerable code snippet of the source code. The vulnerable code snippet may include the at least one vulnerability associated with the source code. Further, the machine learning model may be trained to generate, for the vulnerable code snippet, a remediated code snippet to remediate the at least one vulnerability associated with the source code. Results generated by the machine learning model may be validated, based on an analysis of whether the remediated code snippet remediates the at least one vulnerability associated with the source code. In some examples, differential pruning may be performed for the source code to remove at least one change in the source code that is not relevant to remediation of the at least one vulnerability associated with the source code. Once the machine learning model is trained, for further source code that includes at least one further vulnerability, a further remediated code snippet may be received from the trained machine learning model to remediate the at least one further vulnerability associated with the further source code. Based on the further remediated code snippet, the further source code may be transformed to remediate the at least one further vulnerability associated with the further source code. Thus, the remediated code snippet for the further vulnerable source code may be objectively generated to address at least the aforementioned technical challenges.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example scalable source code vulnerability remediation apparatus (hereinafter also referred to as "apparatus 100").

Referring to FIG. 1, the apparatus 100 may include a data receiver 102 that is executed by at least one hardware processor (e.g., the hardware processor 1802 of FIG. 18, and/or the hardware processor 2004 of FIG. 20) to receive source code 104 that includes at least one vulnerability 106. The data receiver 102 may further receive remediated code 108 that remediates the at least one vulnerability 106 associated with the source code 104. In some examples, a vulnerability analyzer 110 of the data receiver 102 may confirm, for the source code 104, the vulnerability 106 that is exploitable.

A machine learning model trainer 112 that is executed by at least one hardware processor (e.g., the hardware processor 1802 of FIG. 18, and/or the hardware processor 2004 of FIG. 20) may train at least one machine learning model 114 to analyze a vulnerable code snippet 116 of the source code 104. In this regard, the vulnerable code snippet 116 may correspond to the at least one vulnerability 106 associated with the source code 104. The machine learning model 114 may generate, for the vulnerable code snippet 116, a remediated code snippet 118 to remediate the at least one vulnerability 106 associated with the source code 104. In some examples, a remediation identifier 120 of the machine learning model trainer 112 may identify, for the source code 104, a remediation from the at least one machine learning model 114 (that may also be designated as a guided remediation model).

A results validator 122 that is executed by at least one hardware processor (e.g., the hardware processor 1802 of FIG. 18, and/or the hardware processor 2004 of FIG. 20) may validate, based on an analysis of whether the remediated code snippet 118 remediates the at least one vulnerability 106 associated with the source code 104, the remediated code snippet 118.

A data pruner 124 that is executed by at least one hardware processor (e.g., the hardware processor 1802 of FIG. 18, and/or the hardware processor 2004 of FIG. 20) may perform, for the source code 104, differential pruning to remove at least one change in the source code 104 that is not relevant to remediation of the at least one vulnerability 106 associated with the source code 104.

According to examples disclosed herein, the data receiver 102 may receive further source code (e.g., similar to source code 104, but source code that is to be remediated for a vulnerability) that includes at least one further vulnerability (e.g., similar to vulnerability 106, but vulnerability for the further source code 104). A source code transformer 126 that is executed by at least one hardware processor (e.g., the hardware processor 1802 of FIG. 18, and/or the hardware processor 2004 of FIG. 20) may receive, from the at least one trained machine learning model 114, a further remediated code snippet (e.g., similar to the remediated code snippet 118) to remediate the at least one further vulnerability associated with the further source code. The source code transformer 126 may transform, based on the further remediated code snippet, the further source code to remediate the at least one further vulnerability associated with the further source code.

According to examples disclosed herein, the source code transformer 126 may transform, based on a modified version of the further remediated code snippet (e.g., modified, for example, by a developer), the further source code to remediate the at least one further vulnerability associated with the further source code.

According to examples disclosed herein, a similarity analyzer 142 that is executed by at least one hardware processor (e.g., the hardware processor 1802 of FIG. 18, and/or the hardware processor 2004 of FIG. 20) may determine, based on an analysis of the further remediated code snippet and the modified version of the further remediated code snippet, a similarity between the further remediated code snippet and the modified version of the further remediated code snippet.

According to examples disclosed herein, the machine learning model trainer 112 may determine whether the similarity between the further remediated code snippet and the modified version of the further remediated code snippet meets a similarity criterion (e.g., is the similarity greater than 98%, or similarity is 100%). In this regard, the machine learning model trainer 112 may train, based on a determination that the similarity between the further remediated code snippet and the modified version of the further remediated code snippet does not meet the similarity criterion (e.g., similarity is less than or equal to 98%), the at least one machine learning model 114 to generate, for the at least one further vulnerability associated with the further source code, the modified version of the further remediated code snippet to remediate the at least one further vulnerability associated with the further source code.

According to examples disclosed herein, the machine learning model trainer 112 may train, based on a determination that the similarity between the further remediated code snippet and the modified version of the further remediated code snippet meets the similarity criterion (e.g., similarity greater than 98%), the at least one machine learning model 114 to generate, for the at least one further vulnerability associated with the further source code, the further remediated code snippet to remediate the at least one further vulnerability associated with the further source code.

According to examples disclosed herein, the machine learning model trainer 112 may train the at least one machine learning model tokenizing the vulnerable code snippet, sequence tagging the tokenized vulnerable code snippet, and generating, based on the tokenized and sequence tagged vulnerable code snippet, the remediated code snippet.

According to examples disclosed herein, the data receiver 102 may receive further source code that includes at least one further vulnerability. In this regard, the source code transformer 126 may receive, from the at least one trained machine learning model 114, a further remediated code snippet to remediate the at least one further vulnerability associated with the further source code. The further remediated code snippet may correspond to a highest ranked code snippet selected from a plurality of further remediated code snippets. The source code transformer 126 may transform, based on the further remediated code snippet, the further source code to remediate the at least one further vulnerability associated with the further source code. The source code transformer 126 may rank the plurality of further remediated code snippets according to a confidence to remediate the at least one further vulnerability associated with the further source code.

In some examples, a vulnerability pattern identifier 128 of the source code transformer 126 may identify, for the source code 104, a vulnerability pattern 130. In this regard, a remediation selector 132 of the source code transformer 126 may select, for the source code 104, a correct remediation based on a statistical model 134. A remediation recommender 136 of the source code transformer 126 may recommend, for the source code 104 and based on a deep learning model 138, the vulnerability, the guided remediation model, the vulnerability pattern, and the correct remediation, the remediated code snippet 118, which may also be designated as a unified remediation.

The source code transformer 126 may perform, for the source code 104, a remediation on the vulnerable code snippet 116 of the source code 104. In this regard, source code transformer 126 may implement the remediated code snippet to remediate the vulnerability 106 with respect to the source code 104.

Operation of the apparatus 100 is described in further detail with reference to FIGS. 1-17.

Figure 2:
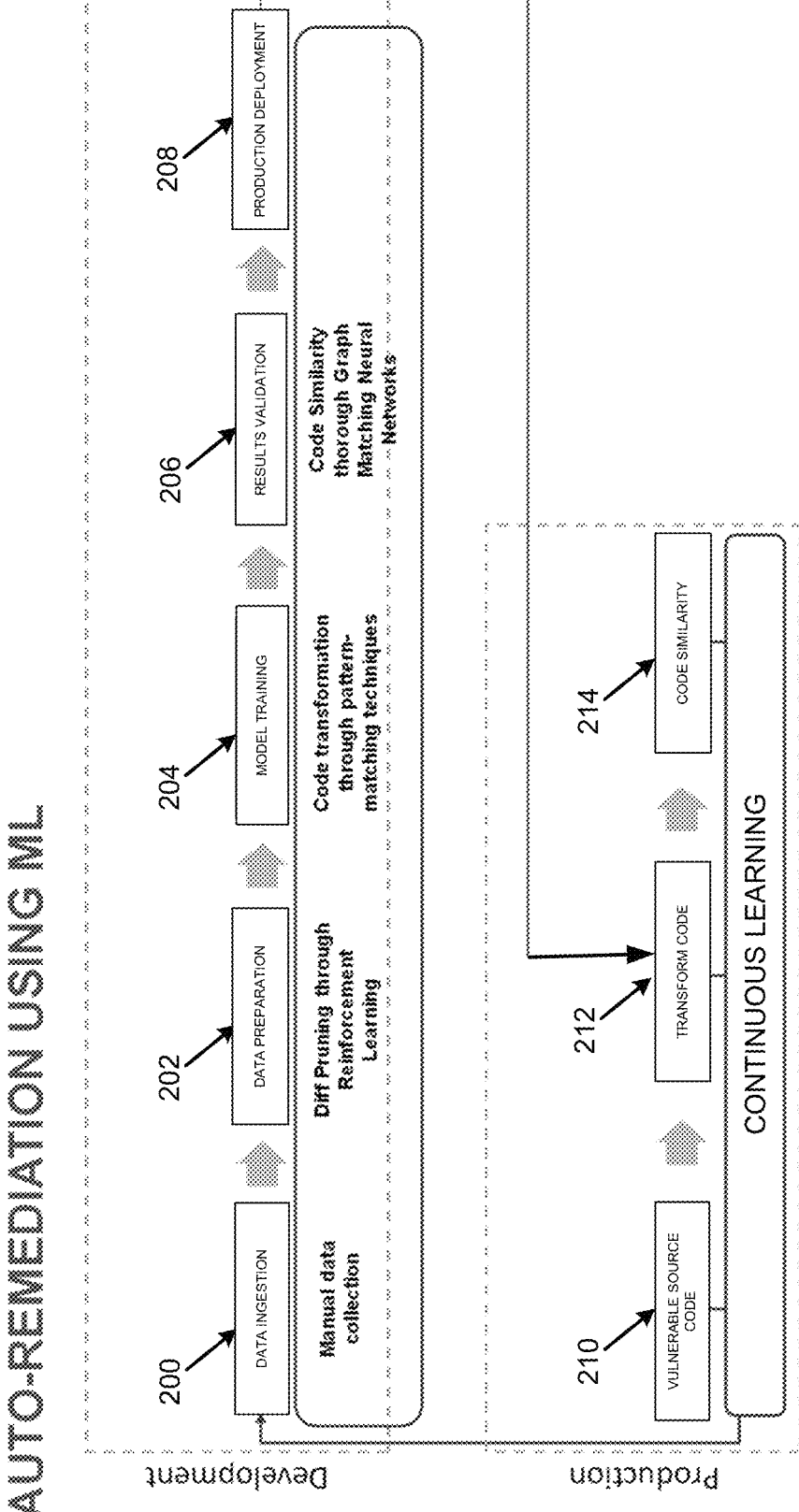
FIG. 2 illustrates further details of the layout of the scalable source code vulnerability remediation apparatus of FIG. 1, in accordance with an example of the present disclosure.

FIG. 2 illustrates further details of the layout of the apparatus 100, in accordance with an example of the present disclosure.

Referring to FIG. 2, in order to train the machine learning model, with respect to a development environment for the apparatus 100, at 200, the data receiver 102 may perform data collection. In this regard, the data may include the source code 104 that includes vulnerabilities, or vulnerabilities that occur in the source code 104, and corresponding remediated code 108 for those vulnerabilities to train the machine learning model 114.

At 202, the data pruner 124 may prepare the collected data by performing differential pruning, for example, through reinforcement learning. In this regard, since a line number of remediated code may have changed from the original code, differential pruning may be utilized to prune any changes that are not relevant.

At 204, the machine learning model trainer 112 may train the machine learning model 114 to read a vulnerable code snippet 116 of the source code 104, and generate a remediated code snippet 118. In this regard, the machine learning model 114 may implement, for example, code transformation through pattern matching.

At 206, the results validator 122 may validate whether the remediated code snippet 118 can actually fix the vulnerability, and whether the code is acceptable to a developer. In this regard, the results validator 122 may implement code similarity through graph matching neural networks.

At 208, the trained machine learning model 114 may be deployed in a production environment.

In the production environment, at 210, the data receiver 102 may ascertain further source code 104 (e.g., vulnerable source code).

At 212, the source code transformer 126 may implement the machine learning model 114 to perform code transformation for the source code 104, for example, through pattern matching.

At 214, with respect to validation, the similarity analyzer 142 may determine whether the remediated code snippet 118 is actually deployed by a developer, or whether the vulnerability is fixed in another manner (e.g., modified), and if so, what are the extent of the changes made by a developer. In this regard, the code similarity analyzer 142 may analyze similarity between the remediated code snippet 118 that is sent to a developer versus deployed code (e.g., a modified version of the remediated code) that is deployed by the developer. This similarity analysis may be used to validate the remediated code snippet 118 as well as to further train the machine learning model 114.

Figure 3:
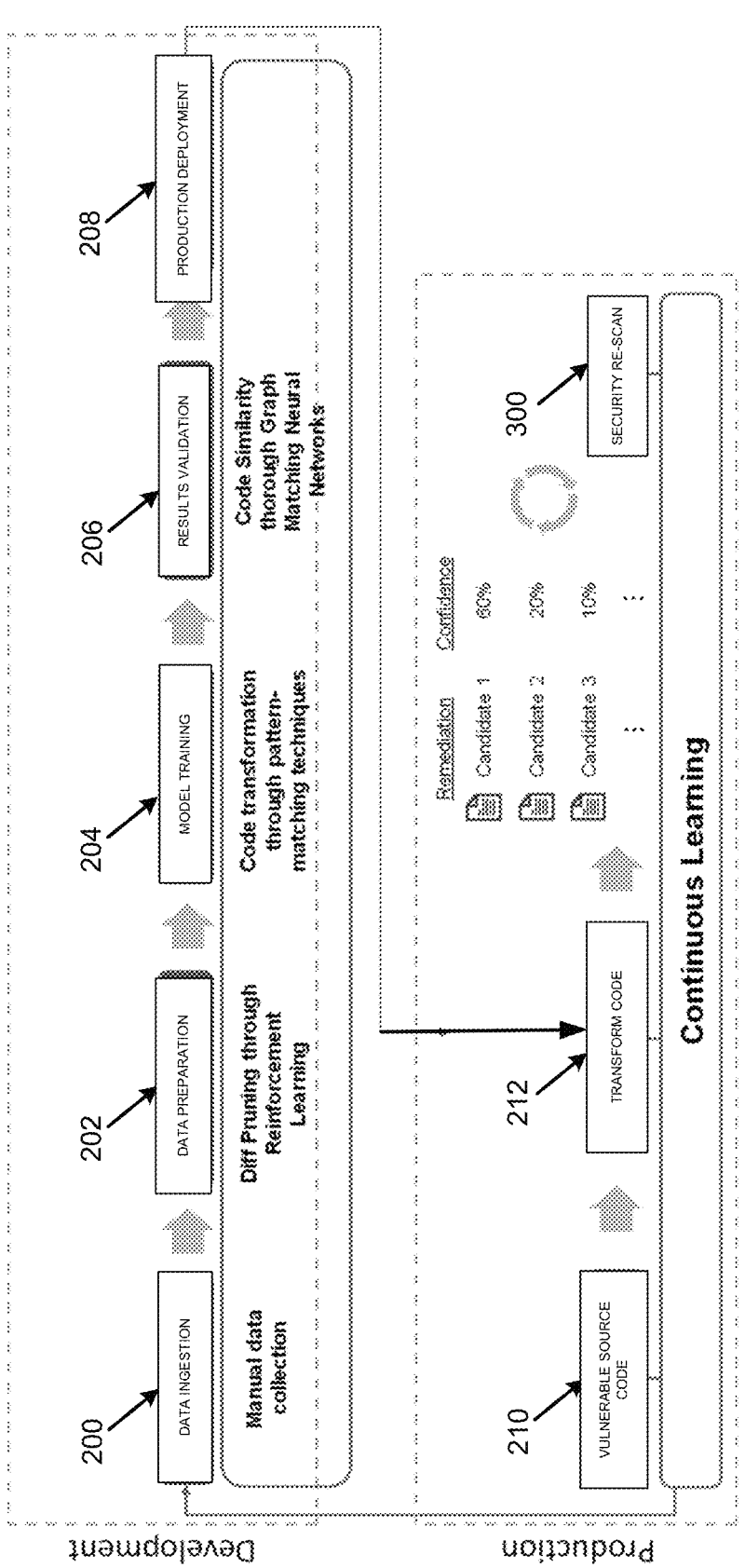
FIG. 3 illustrates a alternative configuration of the layout of the scalable source code vulnerability remediation apparatus of FIG. 1, in accordance with an example of the present disclosure.

FIG. 3 illustrates an alternative configuration of the layout of the apparatus 100, in accordance with an example of the present disclosure.

Referring to FIG. 3, in a similar manner as FIG. 2, the aforementioned activities from data collection through the machine learning model training and validation may take place in the development environment. Once the machine learning model 114 achieves desirable accuracy, the machine learning model 114 may be deployed to the production environment and used for predicting multiple possible remediated codes for a vulnerable code. Each predicted remediated code snippet 118 may be scanned by a security re-scanner 300. The remediated code snippet 118 with the highest confidence that passes the scan may be selected as the final remediation. For example, the remediated code snippet 118 corresponding to candidate 1 that includes a 60% confidence may be selected as the final remediation, and implemented by the source code transformer 126. The confidence associated with the remediated code snippet 118 may be determined, for example, based on factors such as previous successful remediation of a vulnerability by utilizing the remediated code snippet 118 for the associate vulnerability 106 without the remediated code snippet 118 being modified, etc.

Figure 4:
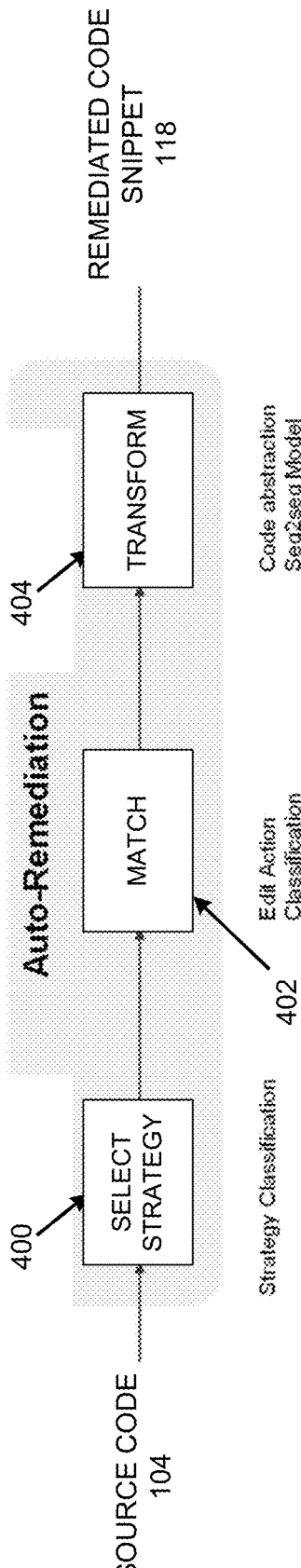
FIG. 4 illustrates use of machine learning models for code transformation to illustrate operation of the scalable source code vulnerability remediation apparatus of FIG. 1, in accordance with an example of the present disclosure.

FIG. 4 illustrates use of machine learning models for code transformation to illustrate operation of the apparatus 100, in accordance with an example of the present disclosure.

Referring to FIG. 4, with respect to strategy selection at 400, the remediation selector 132 may select a strategy from a plurality of strategies to remediate a vulnerability with respect to the vulnerable code snippet 116. With respect to matching at 402, for a vulnerable code snippet 116, the data pruner 124 may determine for each vulnerable code line as to whether the code line needs changes (e.g., transformation), whether the code line should be deleted, or whether a new code line is to be added. With respect to transformation at 404, for each code line that is to be transformed, the source code transformer 126 may determine how each code line is to be transformed, and generate the remediated code snippet 118. The transformation may also depend on vulnerability type, as well as the remediation strategy selected at 400. At 404, an example of a model may include a Seq2Seq model that is used to generate remediated source code lines.

Figure 5:
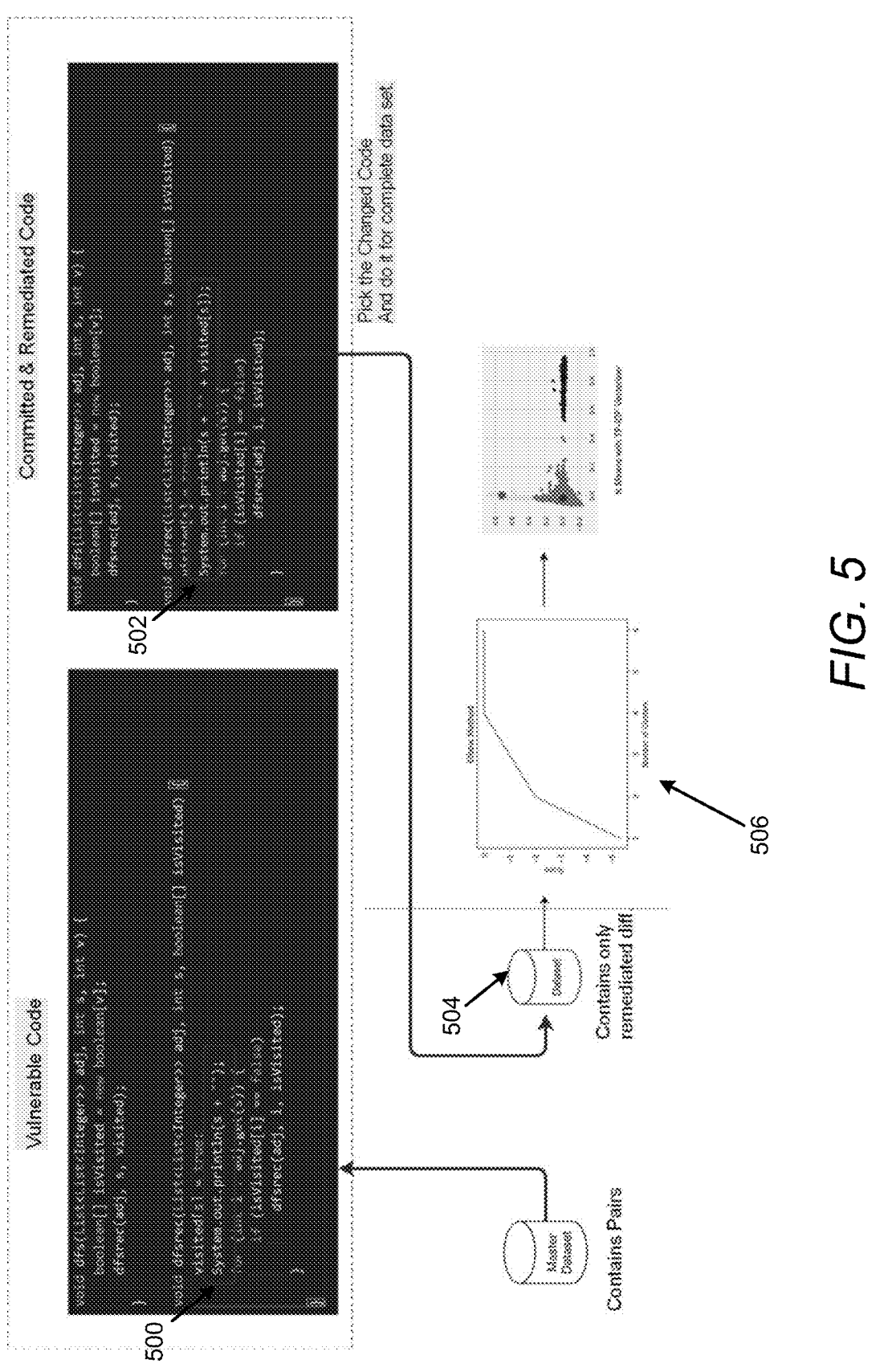
FIG. 5 illustrates advantage actor critic (A2C) pre-processing associated with differential pruning to illustrate operation of the scalable source code vulnerability remediation apparatus of FIG. 1, in accordance with an example of the present disclosure.

FIG. 5 illustrates advantage actor critic (A2C) pre-processing associated with differential pruning to illustrate operation of the apparatus 100, in accordance with an example of the present disclosure.

Referring to FIG. 5, the source code 104 with the vulnerable code snippet 116 is shown at 500, and the remediated code snippet 118 is shown at 502. In this regard, the difference between the vulnerable code snippet 116 at 500 and the remediated code snippet 118 at 502 may be stored in a dataset 504. The differences may be clustered as shown at 506, for example, by using a machine learning model. For example, a number of occurrences in the dataset for each particular difference, if greater than a specified threshold (e.g., 10), may be clustered. For the example of FIG. 5, the difference may be specified as "System.out.println(s+" "+visited[s]);". In this regard, differences below the specified threshold may be pruned by the data pruner 124.

Figure 6:
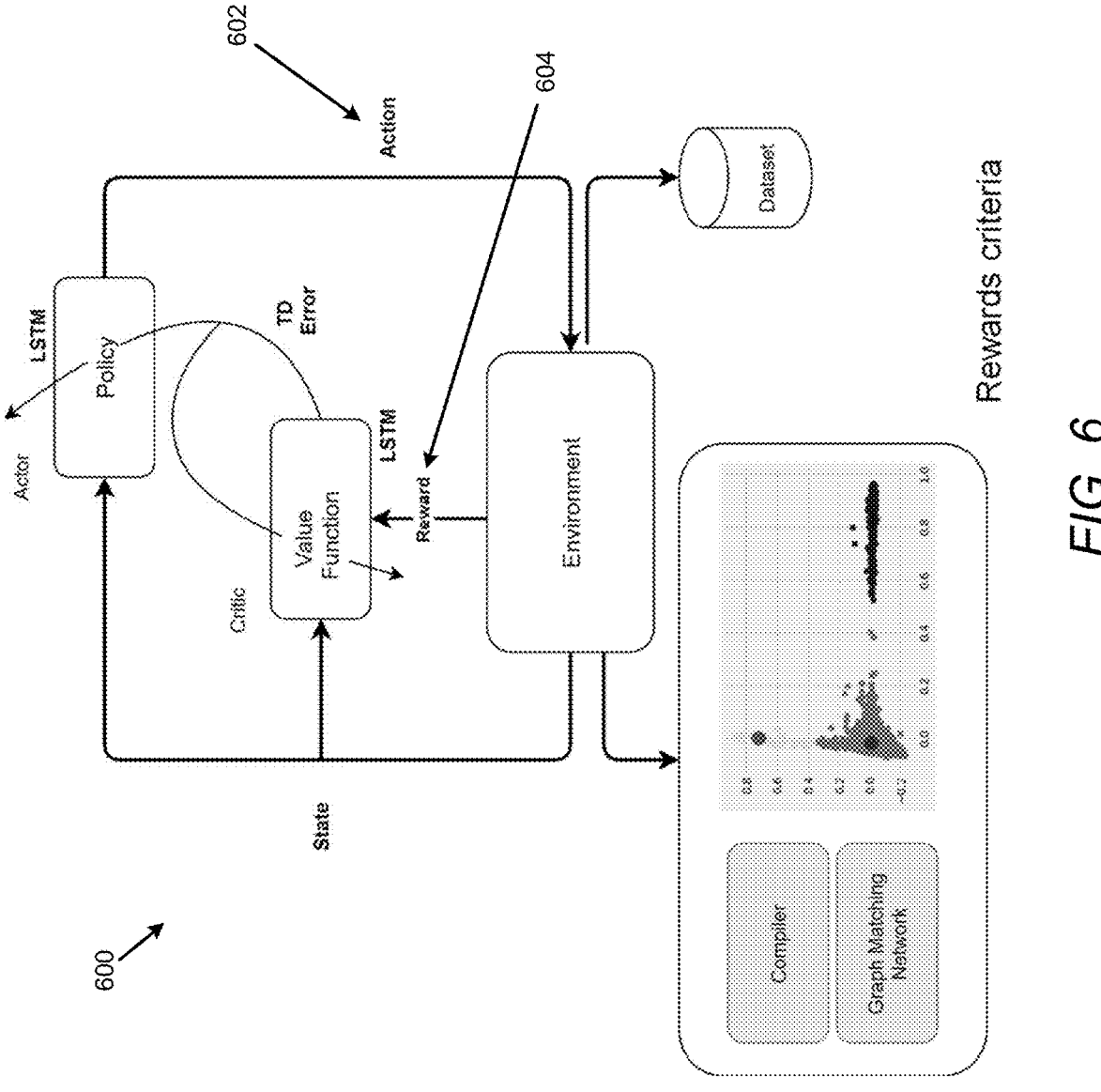
FIG. 6 illustrates A2C deep reinforcement learning associated with differential pruning to illustrate operation of the scalable source code vulnerability remediation apparatus of FIG. 1, in accordance with an example of the present disclosure.

FIG. 6 illustrates A2C deep reinforcement learning associated with differential pruning to illustrate operation of the apparatus 100, in accordance with an example of the present disclosure.

Referring to FIG. 6, for the reinforcement learning model 600, for an action performed at 602, a reward may be generated at 604.

Figure 7:
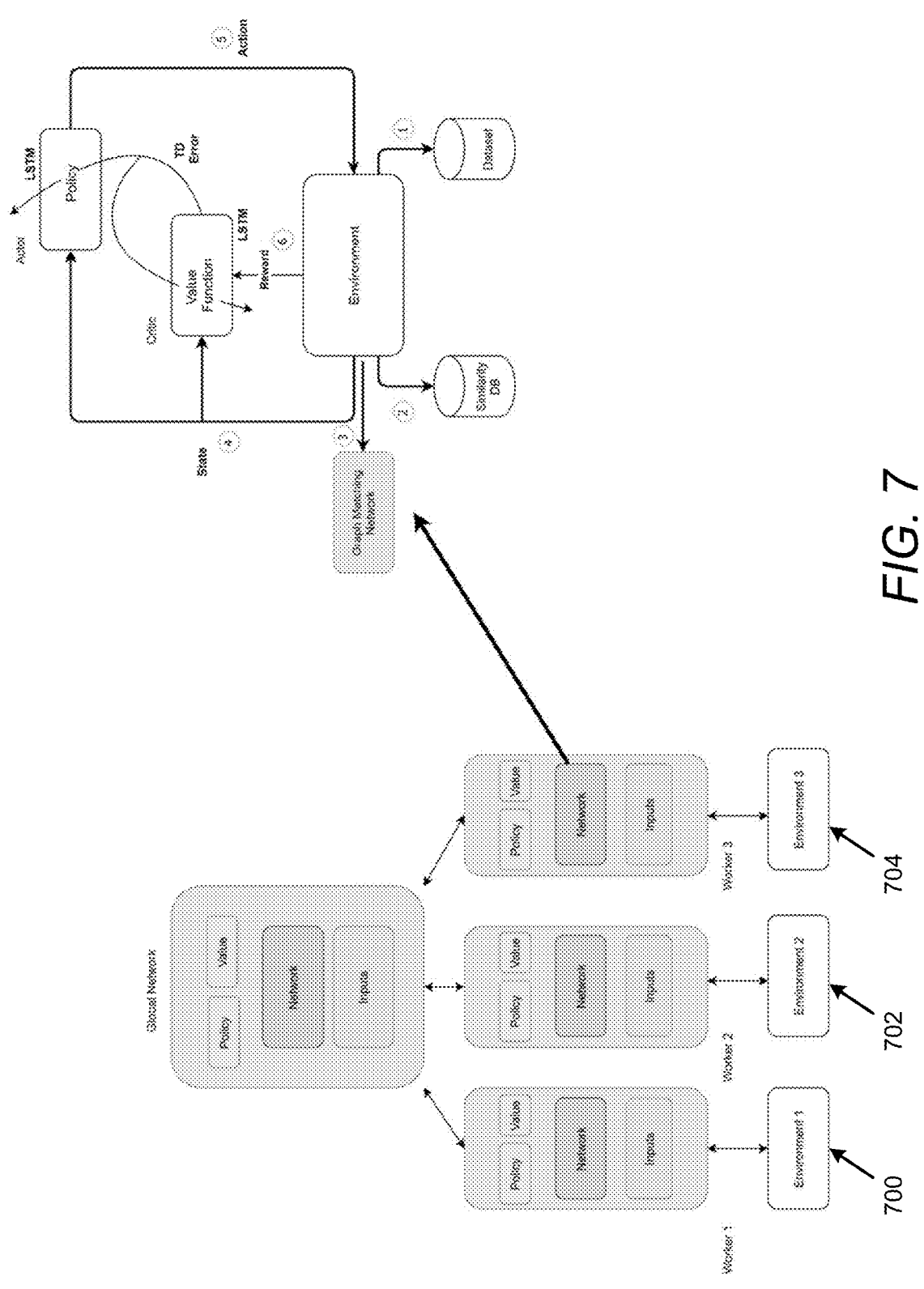
FIG. 7 illustrates further details of A2C associated with differential pruning to illustrate operation of the scalable source code vulnerability remediation apparatus of FIG. 1, in accordance with an example of the present disclosure.

FIG. 7 illustrates further details of A2C associated with differential pruning to illustrate operation of the apparatus 100, in accordance with an example of the present disclosure.

Referring to FIG. 7, each environment at 700, 702, and 704 may check from the clusters determined at 506. In this regard, a positive reward may be awarded for code lines that belong to a cluster, and a negative reward may be awarded for code lines that do not belong to a cluster. Source code lines with a negative reward may be deleted by the data pruner 124 during performance of the differential pruning. Moreover, if deletion of a code line leads to a compilation error, a negative reward may also be awarded. In this manner, the neural network may be trained to appropriately delete certain code lines that are assigned a negative reward.

Figure 8:
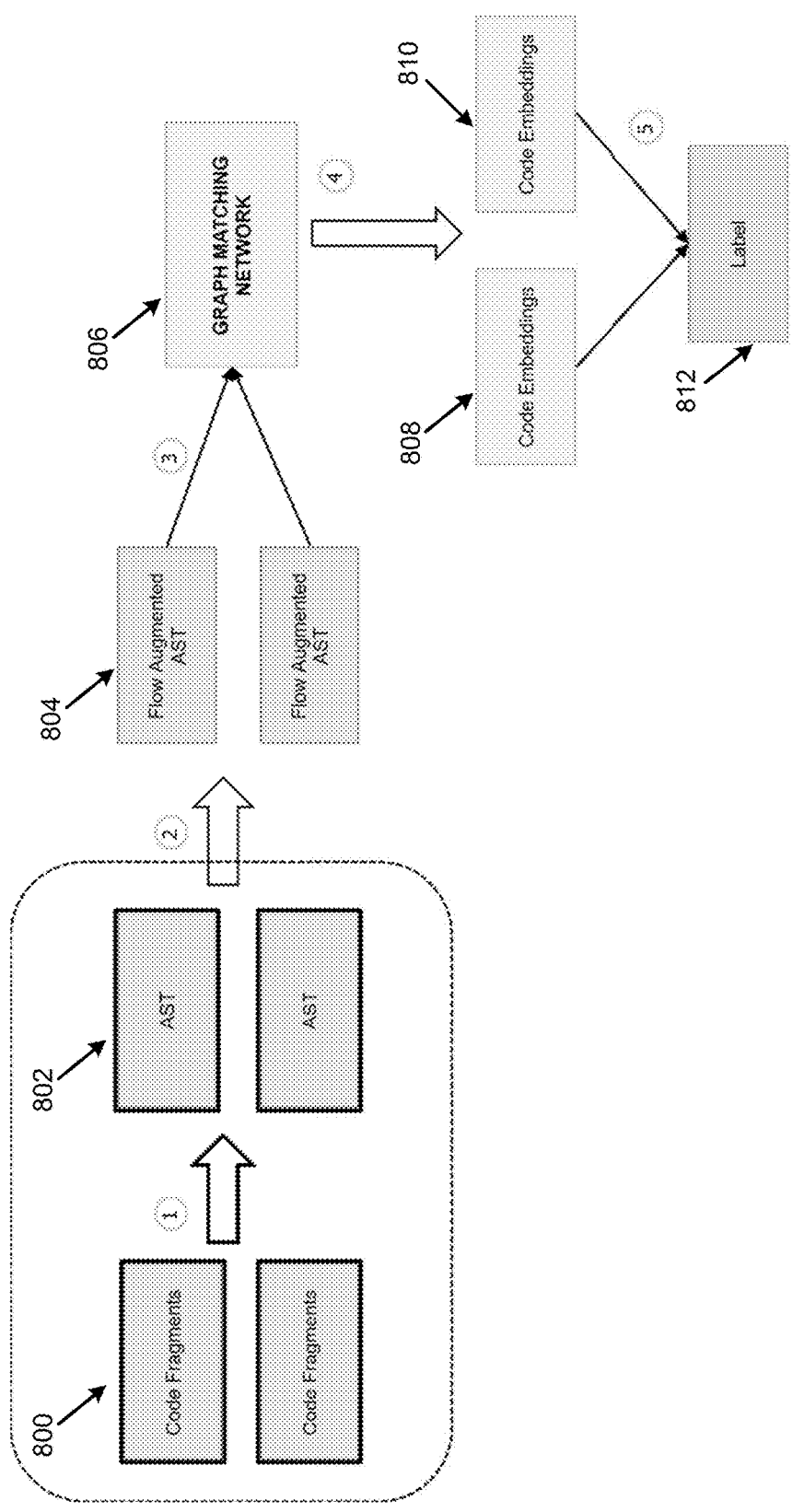
FIG. 8 illustrates a graph matching network approach to illustrate operation of the scalable source code vulnerability remediation apparatus of FIG. 1, in accordance with an example of the present disclosure.

FIG. 8 illustrates a graph matching network approach to illustrate operation of the apparatus 100, in accordance with an example of the present disclosure. FIG. 9 illustrates further details of the graph matching network approach of FIG. 9, including conversion of code to abstract syntax tree (AST), to illustrate operation of the apparatus 100, in accordance with an example of the present disclosure.

Referring to FIG. 8, as disclosed herein, the similarity analyzer 142 may determine, based on an analysis of the further remediated code snippet and the modified version of the further remediated code snippet, a similarity between the further remediated code snippet and the modified version of the further remediated code snippet. For example, the similarity analyzer 142 may implement a graph matching network approach by taking code snippets at 800, and converting them to their respective abstract syntax tree at 802. At 804, flow augmented abstract syntax trees may be fed to a graph matching network at 806, which may be used to determine code embeddings at 808 and 810 (corresponding to respective code fragments), and labeling at 812 that represents the similarity. Referring to FIG. 9, for code at 900, an abstract syntax tree is illustrated at 902.

Figure 10:
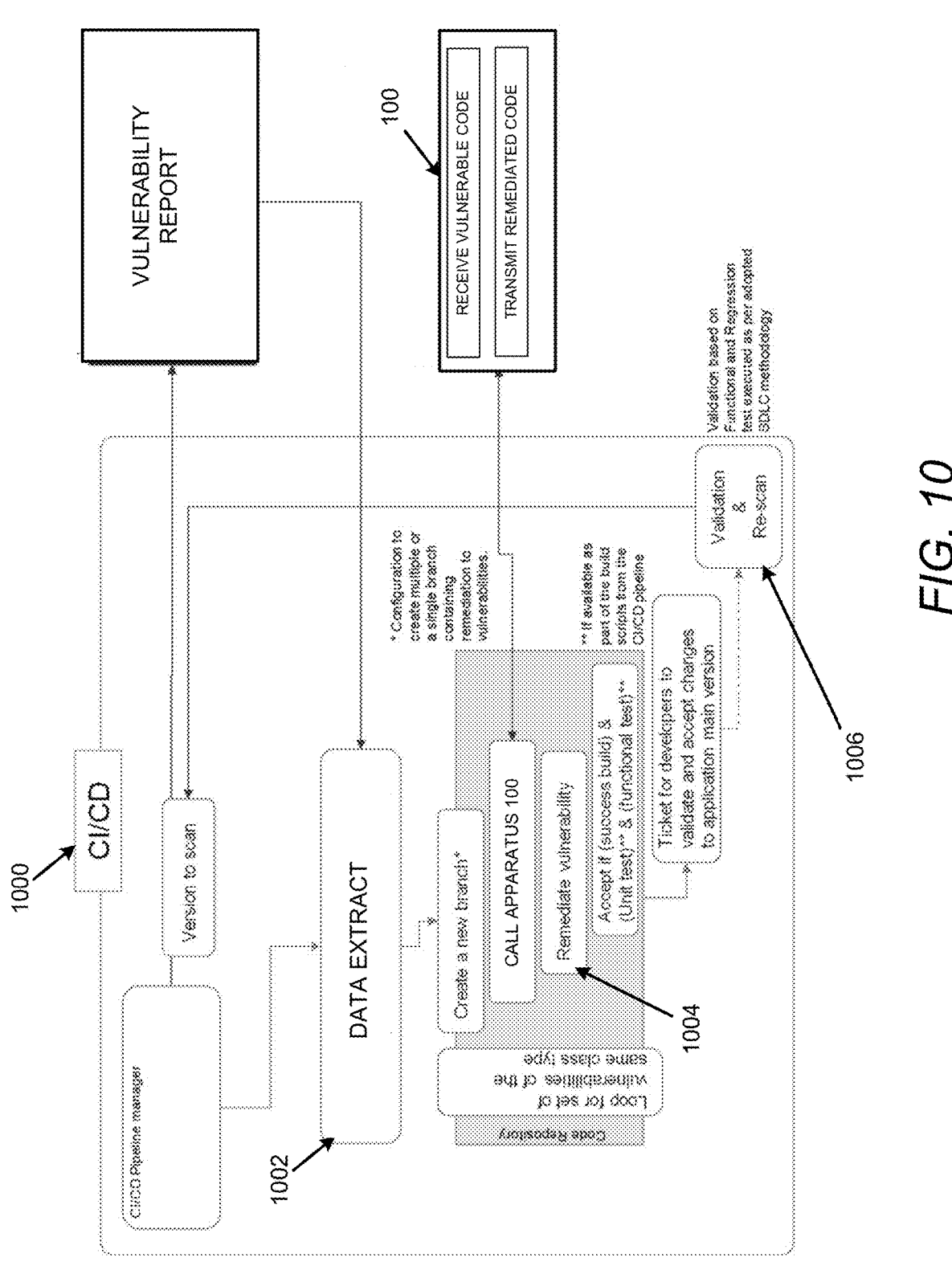
FIG. 10 illustrates an example of remediation integrated to a continuous integration and continuous delivery (CI/CD) pipeline to illustrate operation of the scalable source code vulnerability remediation apparatus of FIG. 1, in accordance with an example of the present disclosure.

FIG. 10 illustrates an example of remediation integrated to a continuous integration and continuous delivery (CI/CD) pipeline to illustrate operation of the apparatus 100, in accordance with an example of the present disclosure.

Referring to FIG. 10, with respect to a CI/CD pipeline at 1000, the remediation may be performed based on two modes of operation that include isolated and chained. For the isolated mode (e.g., clone the branch), vulnerabilities may be fixed in an isolated branch. For the chained mode (e.g., single branch), all vulnerabilities in the same branch may be fixed. For the CI/CD pipeline, data extraction by the data receiver 102 may be performed at 1002, remediation may be performed by the source code transformer 126 at 1004, and validation may be performed by the results validator 122 at 1006.

Figure 11:
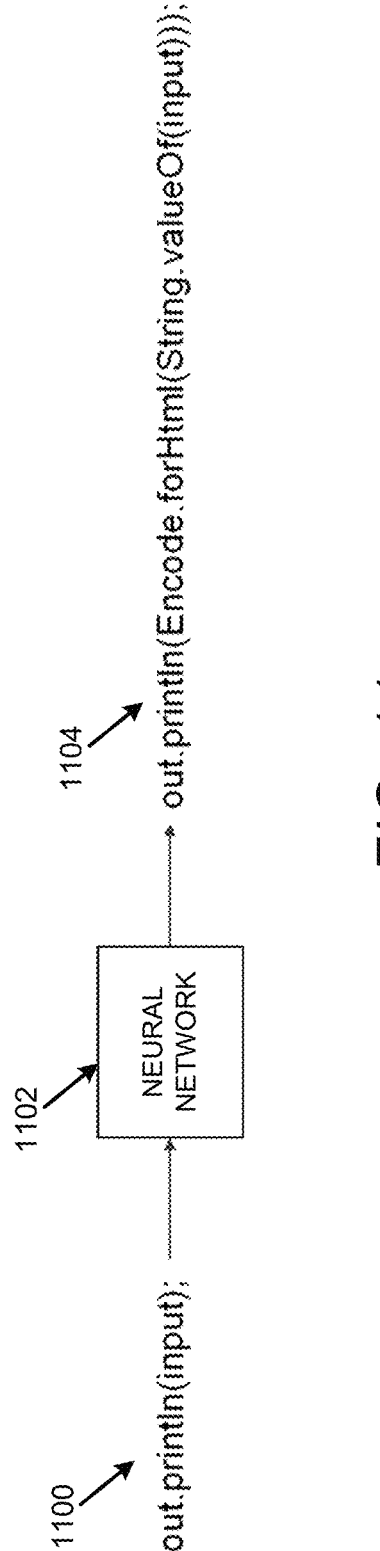
FIG. 11 illustrates neural machine translation to illustrate operation of the scalable source code vulnerability remediation apparatus of FIG. 1, in accordance with an example of the present disclosure.

FIG. 11 illustrates neural machine translation to illustrate operation of the apparatus 100, in accordance with an example of the present disclosure.

Referring to FIG. 11, remediating a vulnerable code line to a non-vulnerable code line may include transforming a sequence of tokens to another sequence of tokens. The transformation may be performed using a deep neural network model that includes an encoder-decoder architecture with an attention mechanism. Given a sequence of tokens, the deep neural network model may predict the output sequence of tokens. Before the input sequence is entered to the deep neural network model, the sequence may be abstracted. All user-defined variables and literals may be replaced with generic names such as ID1, STR1, NUM1, etc. The deep neural network model may predict the output sequence with those generic names. The generic names in the output sequence may be replaced with the original names after the prediction.

At the outset, with respect to cross-site scripting (XSS), malicious content may be sent to a web browser in the form of HTML, XML, etc. An example may include "out.println (input)".

With respect to neural machine translation, content may include ">out.println(input);" and "out.println(Encode-.forHtml(String.valueOf(input)));".As shown in FIG. 11, the input sequence 1100 may be entered into the neural network 1102 to predict the output sequence of tokens 1104. The neural network 1102 may represent a recurrent neural network (RNN) encoder-decoder model with an attention mechanism.

Figure 12:
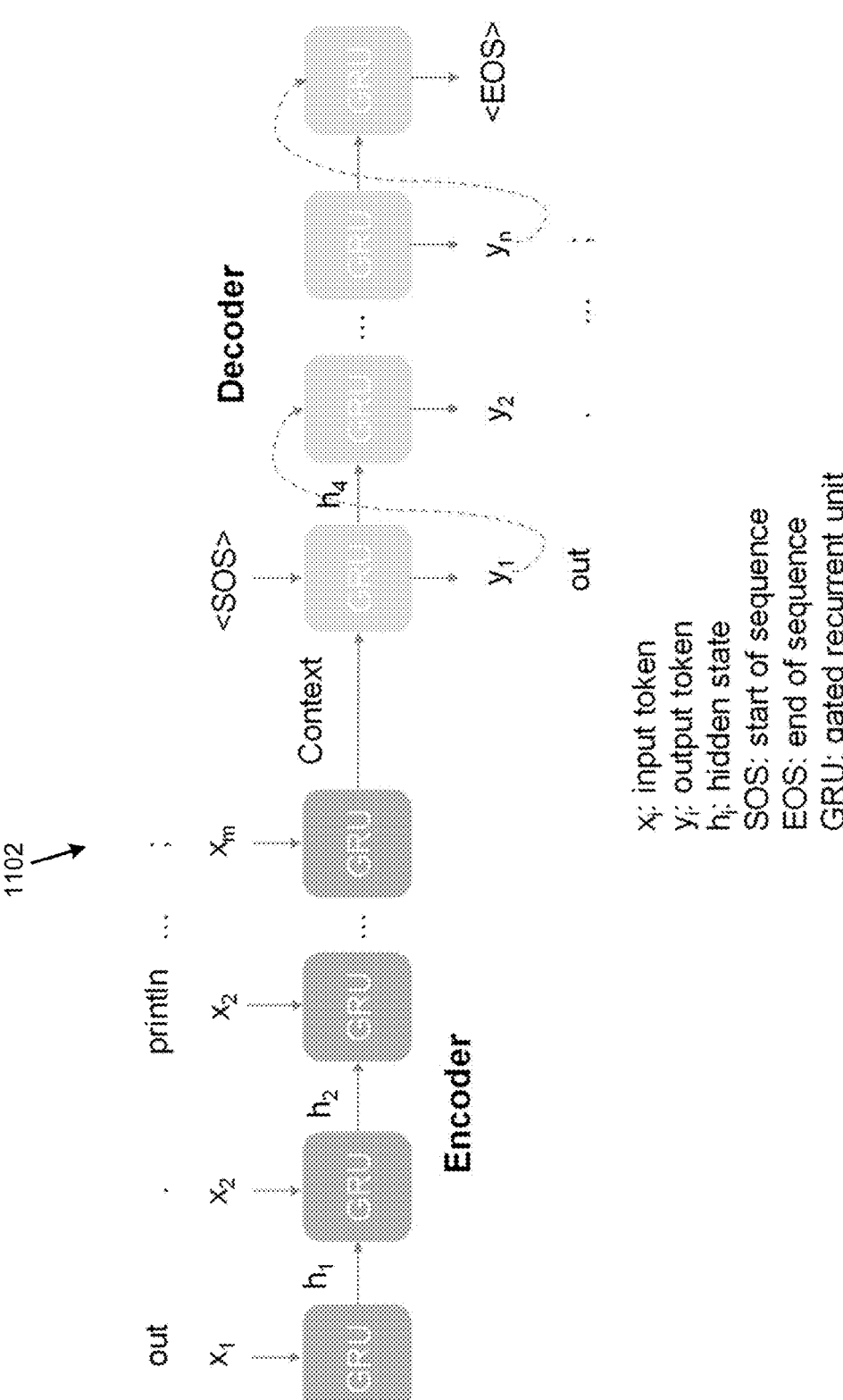
FIG. 12 illustrates an encoder-decoder network to illustrate operation of the scalable source code vulnerability remediation apparatus of FIG. 1, in accordance with an example of the present disclosure.

FIG. 12 illustrates an encoder-decoder network to illustrate operation of the apparatus 100, in accordance with an example of the present disclosure.

Referring to FIG. 12, for the neural network 1102, the xi may represent the input token, $y_i$ may represent the output token, hi may represent the hidden state, SOS may represent start of sequence, EOS may represent end of sequence, and GRU may represent gated recurrent unit. The input tokens may represent the sequence of tokens from a vulnerable code line, and output tokens may represent the sequence of tokens from a remediated code line.

Figure 13:
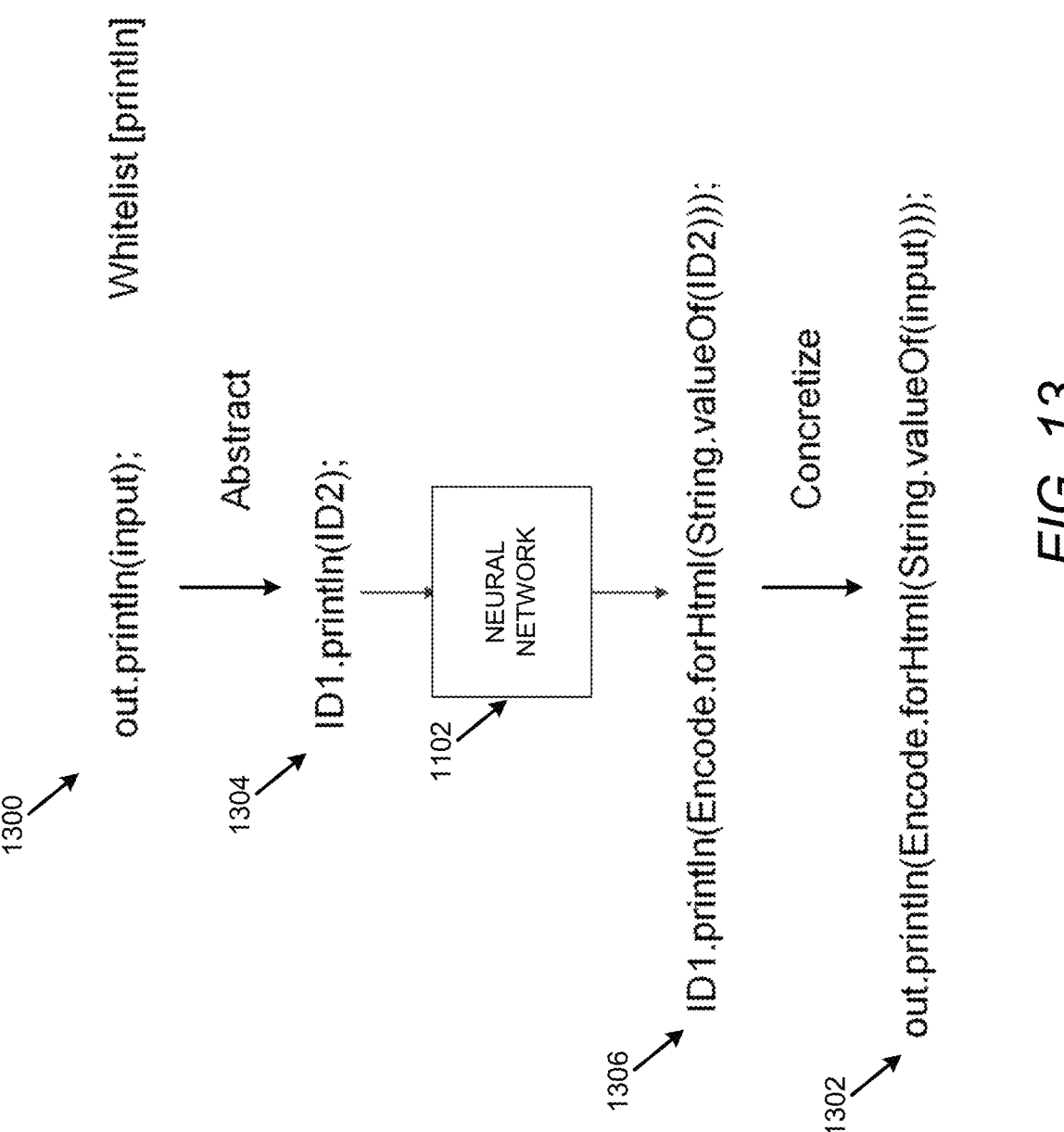
FIG. 13 illustrates source code abstraction to illustrate operation of the scalable source code vulnerability remediation apparatus of FIG. 1, in accordance with an example of the present disclosure.

FIG. 13 illustrates source code abstraction to illustrate operation of the apparatus 100, in accordance with an example of the present disclosure.

Referring to FIG. 13, with respect to source code abstraction, for an input of "out.println(input)" at 1300, the generated output at 1302 may include "out.println(Encode-.forHtml(String.valueOf(input)))". The input may be abstracted to "ID1.println(ID2)" at 1304. The output predicted by the neural network model may contain abstracted names such as ID2 at 1306. The abstracted output at 1306 may be concretized to the output at 1302.

FIG. 14 illustrates a remediation flow to illustrate operation of the apparatus 100, in accordance with an example of the present disclosure.

Referring to FIG. 14, sequence tagging (e.g., by the machine learning model 114) may include sanitizing a path before its use. For example, the line "File myDir=new File(dirName)" may be changed to the lines "String absoluteFilePath=Paths.get(dirName).toFile( )getAbsolute-Path( )", "String remediatedFilePath=absoluteFilePath.replaceAll(\"^(.+)? (\\\\[.]+\\\\)(.+)?$\", \"_\")" and "File myDir=new File(re-mediatedFilePath)".

For the template 1400, the machine learning model 114 may perform a path extraction operation at 1402 to extract specified tokens (e.g., dirName), and a string manipulation operation may be performed at 1404 to generate the output string with the modified input line.

FIG. 15 illustrates sequence tagging to illustrate operation of the apparatus 100, in accordance with an example of the present disclosure.

Referring to FIG. 15, sequence tagging may include tagging, by the machine learning model 114, of relevant tokens (or words) of a sequence 1500. For example, for the sequence 1500, the token dirName may be tagged as 1, and all other tokens may be tagged as 0. In this manner, a tagged sequence for "File myDir=new File (dirName)" may be generated as "0 0 0 0 0 0 1 0 0".

Figure 16:
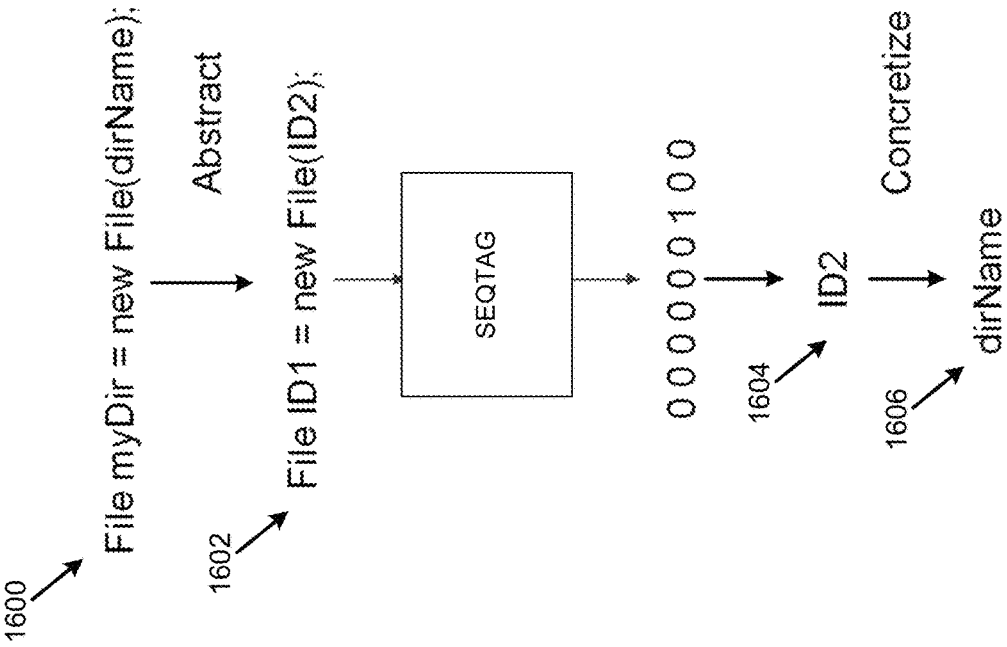
FIG. 16 illustrates source code abstraction to illustrate operation of the scalable source code vulnerability remediation apparatus of FIG. 1, in accordance with an example of the present disclosure.

FIG. 16 illustrates source code abstraction to illustrate operation of the apparatus 100, in accordance with an example of the present disclosure.

Referring to FIG. 16, the input 1600 may be abstracted to "File ID1=new File (ID2)" at 1602, and the output tagged sequence may be abstracted to "ID2" at 1604. The abstracted output at 1604 may be concretized to the output "dirName" at 1606.

Figure 17:
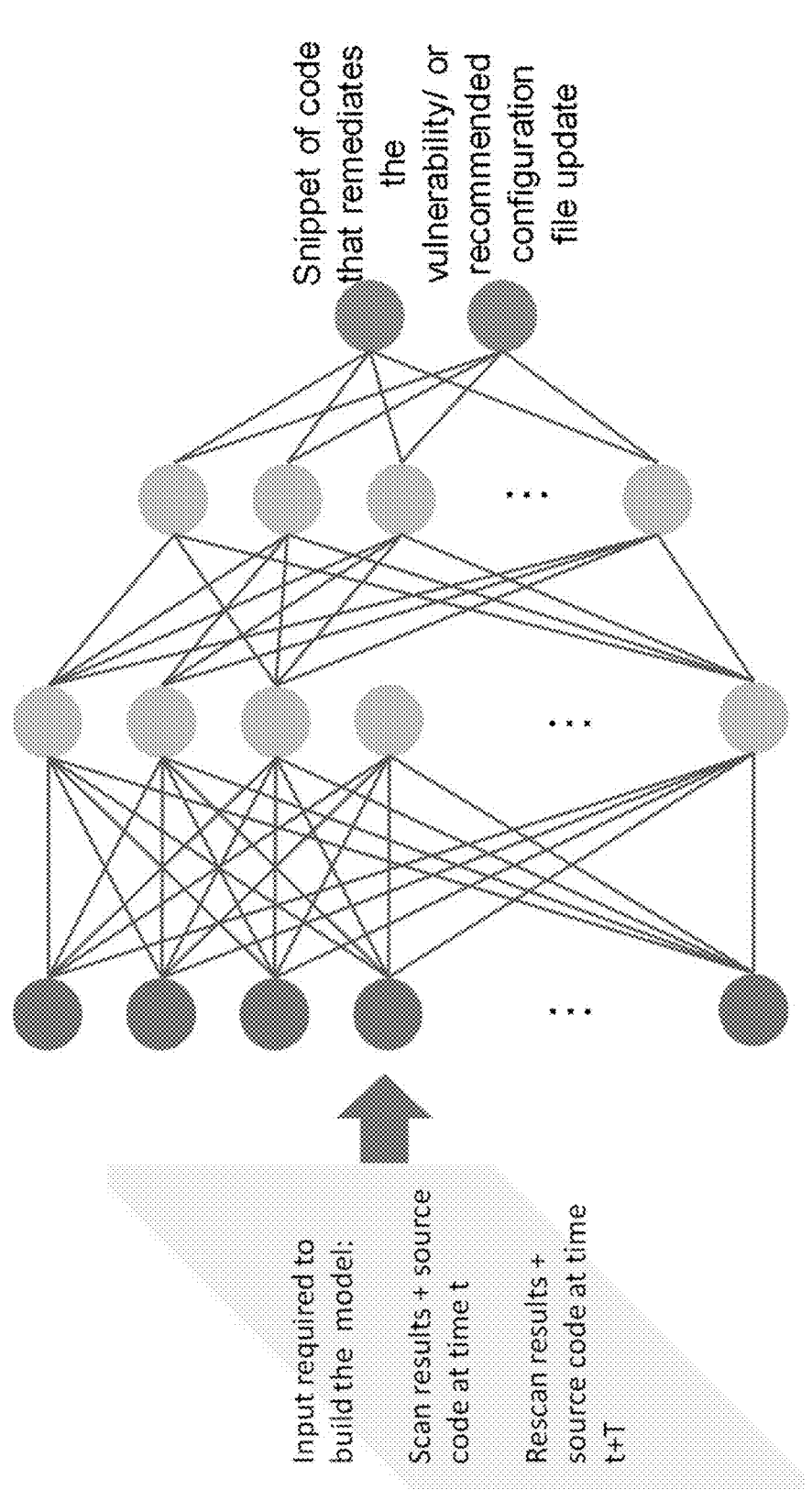
FIG. 17 illustrates data-driven remediation to illustrate operation of the scalable source code vulnerability remediation apparatus of FIG. 1 in accordance with an example of the present disclosure.

FIG. 17 illustrates data-driven remediation to illustrate operation of the apparatus 100 in accordance with an example of the present disclosure.

Referring to FIG. 17, with respect to data-driven remediation, the machine learning model 114 may learn from updates to source code 104. In this regard, the machine learning model 114 may implement continuous learning and accuracy improvement over time. The data-driven remediation may leverage syntax tree abstraction models that capture code token sequences. The syntax tree abstraction models may be implemented, for example, for Java, PHP and Python.

Figure 20:
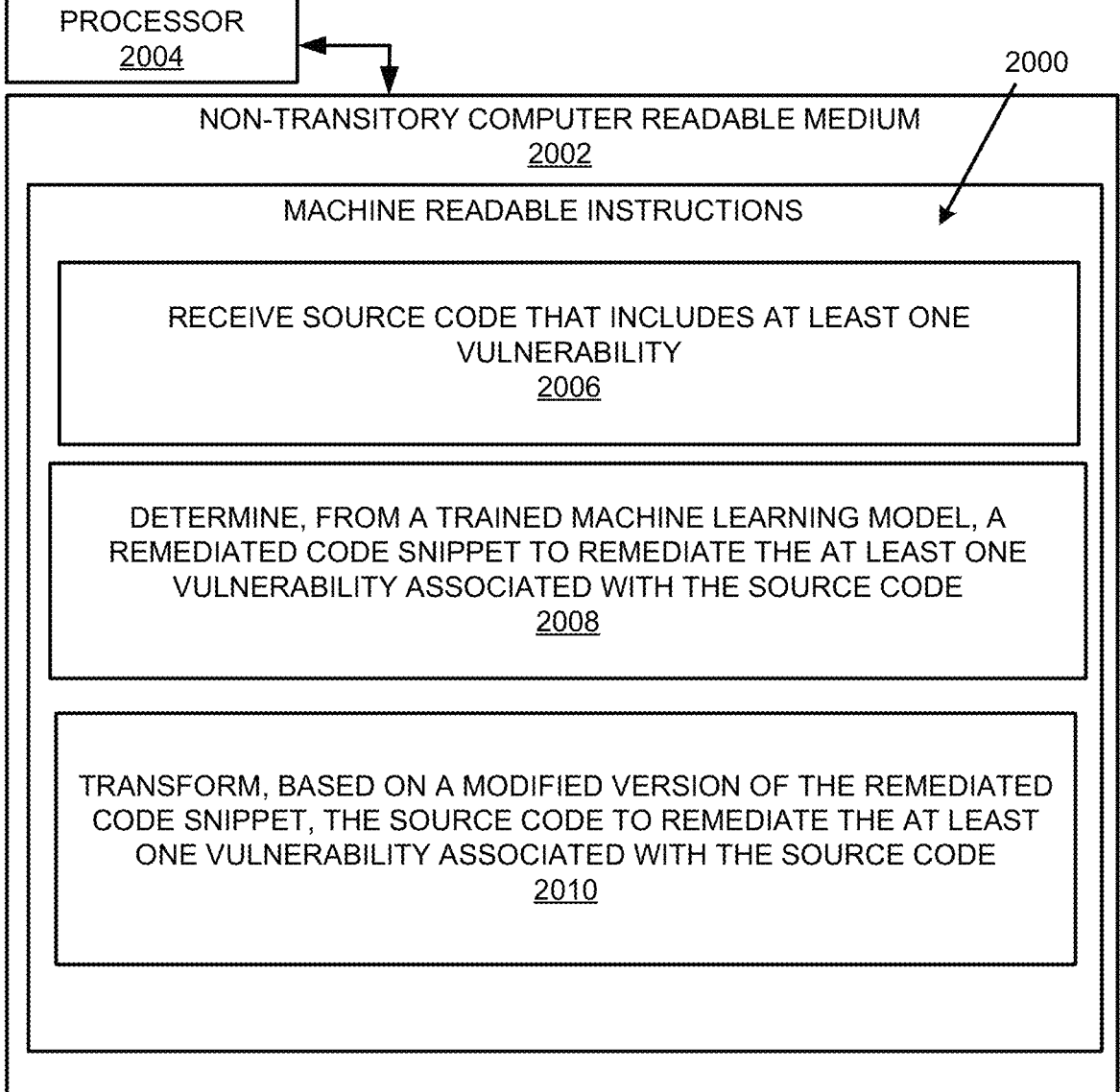
FIG. 20 illustrates a further example block diagram for scalable source code vulnerability remediation in accordance with another example of the present disclosure.

FIGS. 18-20 respectively illustrate an example block diagram 1800, a flowchart of an example method 1900, and a further example block diagram 2000 for scalable source code vulnerability remediation, according to examples. The block diagram 1800, the method 1900, and the block diagram 2000 may be implemented on the apparatus 100 described above with reference to FIG. 1 by way of example and not of limitation. The block diagram 1800, the method 1900, and the block diagram 2000 may be practiced in other apparatus. In addition to showing the block diagram 1800, FIG. 18 shows hardware of the apparatus 100 that may execute the instructions of the block diagram 1800. The hardware may include a processor 1802, and a memory 1804 storing machine readable instructions that when executed by the processor cause the processor to perform the instructions of the block diagram 1800. The memory 1804 may represent a non-transitory computer readable medium. FIG. 19 may represent an example method for scalable source code vulnerability remediation, and the steps of the method. FIG. 20 may represent a non-transitory computer readable medium 2002 having stored thereon machine readable instructions to provide scalable source code vulnerability remediation according to an example. The machine readable instructions, when executed, cause a processor 2004 to perform the instructions of the block diagram 2000 also shown in FIG. 20.

The processor 1802 of FIG. 18 and/or the processor 2004 of FIG. 20 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 2002 of FIG. 20), such as hardware storage devices (e.g., RAM (random access memory), ROM (read only memory), EPROM (erasable, programmable ROM), EEPROM (electrically erasable, programmable ROM), hard drives, and flash memory). The memory 1804 may include a RAM, where the machine readable instructions and data for a processor may reside during runtime.

Referring to FIGS. 1-18, and particularly to the block diagram 1800 shown in FIG. 18, the memory 1804 may include instructions 1806 to receive source code 104 that includes at least one vulnerability 106.

The processor 1802 may fetch, decode, and execute the instructions 1808 to receive remediated code 108 that remediates the at least one vulnerability 106 associated with the source code 104.

The processor 1802 may fetch, decode, and execute the instructions 1810 to train a machine learning model 114 to analyze a vulnerable code snippet 116 of the source code 104.

The processor 1802 may fetch, decode, and execute the instructions 1812 to generate, for the vulnerable code snippet 116, a remediated code snippet 118 to remediate the at least one vulnerability 106 associated with the source code 104.

The processor 1802 may fetch, decode, and execute the instructions 1814 to validate, based on an analysis of whether the remediated code snippet 118 remediates the at least one vulnerability 106 associated with the source code 104, the remediated code snippet 118.

Referring to FIGS. 1-17 and 19, and particularly FIG. 19, for the method 1900, at block 1902, the method may include receiving source code 104 that includes at least one vulnerability 106.

At block 1904, the method may include determining, from a trained machine learning model 114, a remediated code snippet 118 to remediate the at least one vulnerability 106 associated with the source code 104.

At block 1906, the method may include transforming, based on the remediated code snippet 118, the source code 104 to remediate the at least one vulnerability 106 associated with the source code 104.

Referring to FIGS. 1-17 and 20, and particularly FIG. 20, for the block diagram 2000, the non-transitory computer readable medium 2002 may include instructions 2006 to receive source code 104 that includes at least one vulnerability 106.

The processor 2004 may fetch, decode, and execute the instructions 2008 to determine, from a trained machine learning model 114, a remediated code snippet 118 to remediate the at least one vulnerability 106 associated with the source code 104.

The processor 2004 may fetch, decode, and execute the instructions 2010 to transform, based on a modified version of the remediated code snippet, the source code 104 to remediate the at least one vulnerability 106 associated with the source code 104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A scalable source code vulnerability remediation apparatus comprising: a data receiver, executed by at least one hardware processor, to receive source code that includes at least one vulnerability, and receive remediated code that remediates the at least one vulnerability associated with the source code; and receive further source code that includes at least one further vulnerability; a machine learning model trainer, executed by the at least one hardware processor, to train at least one machine learning model to analyze a vulnerable code snippet of the source code, wherein the vulnerable code snippet corresponds to the at least one vulnerability associated with the source code, and generate, for the vulnerable code snippet, a remediated code snippet to remediate the at least one vulnerability associated with the source code; a results validator, executed by the at least one hardware processor, to validate, based on an analysis of whether the remediated code snippet remediates the at least one vulnerability associated with the source code, the remediated code snippet; a source code transformer, executed by the at least one hardware processor, to: receive, from the at least one machine learning model, a further remediated code snippet to remediate the at least one further vulnerability associated with the further source code; and transform, based on the further remediated code snippet or a modified version of the further remediated code snippet, the further source code to remediate the at least one further vulnerability associated with the further source code; and a similarity analyzer, executed by the at least one hardware processor, to determine, based on utilization of an abstract syntax tree and a graph neural network, a similarity between the further remediated code snippet and the modified version of the further remediated code snippet; wherein further training of the at least one machine learning model is based on the determined similarity, wherein the at least one machine learning model is trained by: tokenizing the vulnerable code snippet into lexical elements, sequence tagging the tokenized lexical elements to identify vulnerability-related components using a supervised annotation schema, and generating, based on the tokenized and sequence tagged vulnerable code snippet, a context-preserving remediated code-snippet by applying transformation rules learned from historical vulnerability-remediation pairs.

2. The scalable source code vulnerability remediation apparatus according to claim 1, further comprising: a data pruner, executed by the at least one hardware processor, to perform, for the source code, differential pruning to remove at least one change in the source code that is not relevant to remediation of the at least one vulnerability associated with the source code.

3. The scalable source code vulnerability remediation apparatus according to claim 1, wherein the machine learning model trainer is executed by the at least one hardware processor to: determine whether the similarity between the further remediated code snippet and the modified version of the further remediated code snippet meets a similarity criterion; and train, based on a determination that the similarity between the further remediated code snippet and the modified version of the further remediated code snippet does not meet the similarity criterion, the at least one machine learning model to generate, for the at least one further vulnerability associated with the further source code, the modified version of the further remediated code snippet to remediate the at least one further vulnerability associated with the further source code.

4. The scalable source code vulnerability remediation apparatus according to claim 1, wherein the machine learning model trainer is executed by the at least one hardware processor to: determine whether the similarity between the further remediated code snippet and the modified version of the further remediated code snippet meets a similarity criterion; and train, based on a determination that the similarity between the further remediated code snippet and the modified version of the further remediated code snippet meets the similarity criterion, the at least one machine learning model to generate, for the at least one further vulnerability associated with the further source code, the further remediated code snippet to remediate the at least one further vulnerability associated with the further source code.

5. The scalable source code vulnerability remediation apparatus according to claim 1, wherein the data receiver is executed by at least one hardware processor to receive further source code that includes at least one further vulnerability, further comprising: a source code transformer, executed by the at least one hardware processor, to receive, from the at least one trained machine learning model, a further remediated code snippet to remediate the at least one further vulnerability associated with the further source code, wherein the further remediated code snippet corresponds to a highest ranked code snippet selected from a plurality of further remediated code snippets; and transform, based on the further remediated code snippet, the further source code to remediate the at least one further vulnerability associated with the further source code.

6. The scalable vulnerability remediation apparatus according to claim 5, wherein the source code transformer is executed by the at least one hardware processor to: rank the plurality of further remediated code snippets according to a confidence to remediate the at least one further vulnerability associated with the further source code.

7. A method for scalable source code vulnerability remediation, the method comprising: receiving, by at least one hardware processor, source code that includes at least one vulnerability; receiving, by the at least one hardware processor, remediated code that remediates the at least one vulnerability associated with the source code; and receiving, by the at least one hardware processor, further source code that includes at least one further vulnerability; determining, by the at least one hardware processor, from a trained machine learning model, for a vulnerable code snippet of the source code, a remediated code snippet to remediate the at least one vulnerability associated with the source code; and executing, by the at least one hardware processor, a source code transformer for: receiving, from the trained machine learning model, a further remediated code snippet to remediate the at least one further vulnerability associated with the further source code; and transforming, by the at least one hardware processor, based on the further remediated code snippet or a modified version of the further remediated code snippet, the further source code to remediate the at least one further vulnerability associated with the further source code; and executing, by the at least one hardware processor, a similarity analyzer to determine, based on utilization of an abstract syntax tree and a graph neural network, a similarity between the further remediated code snippet and the modified version of the further remediated code snippet; wherein further training of the trained machine learning model is based on the determined similarity wherein the trained machine learning model is trained by: tokenizing the vulnerable code snippet into lexical elements, sequence tagging the tokenized lexical elements to identify vulnerability-related components using a supervised annotation schema, and generating, based on the tokenized and sequence tagged vulnerable code snippet, a context-preserving remediated code-snippet by applying transformation rules learned from historical vulnerability-remediation pairs.

8. The method for scalable source code vulnerability remediation according to claim 7, further comprising: ranking, by the at least one hardware processor, a plurality of remediated code snippets to remediate the at least one vulnerability associated with the source code; and selecting, from the plurality of remediated code snippets, a highest ranked remediated code snippet as the remediated code snippet to remediate the at least one vulnerability associated with the source code.

9. The method for scalable source code vulnerability remediation according to claim 8, wherein ranking, by the at least one hardware processor, the plurality of remediated code snippets to remediate the at least one vulnerability associated with the source code further comprises: ranking, by the at least one hardware processor, the plurality of remediated code snippets according to a confidence to remediate the at least one vulnerability associated with the source code.

10. The method for scalable source code vulnerability remediation according to claim 7, further comprising: performing, by the at least one hardware processor, for the source code, differential pruning to remove at least one change in the source code that is not relevant to remediation of the at least one vulnerability associated with the source code.

11. A non-transitory computer readable medium having stored thereon machine readable instructions, the machine readable instructions, when executed by at least one hardware processor, cause the at least one hardware processor to: receive source code that includes at least one vulnerability; receive, by at least one hardware processor, remediated code that remediates the at least one vulnerability associated with the source code; and receive, by at least one hardware processor, further source code that includes at least one further vulnerability; determine, from a trained machine learning model, for a vulnerable code snippet of the source code, a remediated code snippet to remediate the at least one vulnerability associated with the source code; and execute a source code transformer, by the at least one hardware processor, to: receive, from the trained machine learning model, a further remediated code snippet to remediate the at least one further vulnerability associated with the further source code; and transform, based on the further remediated code snippet or a modified version of the further remediated code snippet, the further source code to remediate the at least one further vulnerability associated with the further source code; and execute a similarity analyzer, by the at least one hardware processor, to determine, based on utilization of an abstract syntax tree and a graph neural network, a similarity between the further remediated code snippet and the modified version of the further remediated code snippet; wherein further training of the trained machine learning model is based on the determined similarity, wherein the trained machine learning model is trained by: tokenizing the vulnerable code snippet into lexical elements, sequence tagging the tokenized lexical elements to identify vulnerability-related components using a supervised annotation schema, and generating, based on the tokenized and sequence tagged vulnerable code snippet, a context-preserving remediated code-snippet by applying transformation rules learned from historical vulnerability-remediation pairs.

12. The non-transitory computer readable medium according to claim 11, the machine readable instructions, when executed by the at least one hardware processor, further cause the at least one hardware processor to: determine whether the similarity between the remediated code snippet and the modified version of the remediated code snippet meets a similarity criterion; and train, based on a determination that the similarity between the remediated code snippet and the modified version of the remediated code snippet does not meet the similarity criterion, the machine learning model to generate, for the at least one vulnerability associated with the source code, the modified version of the remediated code snippet to remediate the at least one vulnerability associated with the source code.

13. The non-transitory computer readable medium according to claim 11, the machine readable instructions, when executed by the at least one hardware processor, further cause the at least one hardware processor to:
determine whether the similarity between the remediated code snippet and the modified version of the remediated code snippet meets a similarity criterion; and train, based on a determination that the similarity between the remediated code snippet and the modified version of the remediated code snippet meets the similarity criterion, the machine learning model to generate, for the at least one vulnerability associated with the source code, the remediated code snippet to remediate the at least one vulnerability associated with the source code.

14. The non-transitory computer readable medium according to claim 11, the machine readable instructions, when executed by the at least one hardware processor, further cause the at least one hardware processor to: perform, for the source code, differential pruning to remove at least one change in the source code that is not relevant to remediation of the at least one vulnerability associated with the source code.

\* \* \* \* \*